(12) United States Patent
Acevedo

(10) Patent No.: US 9,097,968 B1
(45) Date of Patent: Aug. 4, 2015

(54) AUDIOVISUAL PRESENTATION SYSTEM COMPRISING AN ENCLOSURE SCREEN AND OUTSIDE PROJECTORS DIRECTED TOWARDS THE ENCLOSURE SCREEN

(76) Inventor: Manuel Acevedo, Coral Springs, FL (US)

( * ) Notice: Subject to any disclaimer, the term of this patent is extended or adjusted under 35 U.S.C. 154(b) by 409 days.

(21) Appl. No.: 13/486,308

(22) Filed: Jun. 1, 2012

Related U.S. Application Data

(60) Provisional application No. 61/507,392, filed on Jul. 13, 2011.

(51) Int. Cl.
| | |
|---|---|
| G03B 21/62 | (2014.01) |
| G03B 21/56 | (2006.01) |
| H04N 13/04 | (2006.01) |
| G06T 3/00 | (2006.01) |
| H04N 13/02 | (2006.01) |

(52) U.S. Cl.
CPC .............. *G03B 21/62* (2013.01); *G03B 21/56* (2013.01); *G06T 3/005* (2013.01); *H04N 13/0296* (2013.01); *H04N 13/0459* (2013.01); *H04N 13/0497* (2013.01)

(58) Field of Classification Search
CPC ........ G03B 21/62; G03B 21/56; G03B 35/00; G03B 37/00; G03B 37/04; G03B 21/00; G06T 3/005; H04N 13/0296; H04N 13/0459; H04N 13/0497; H04N 19/00769; H04N 5/74

USPC ....... 353/15, 30; 52/6–8, 82; 352/36; 348/36, 348/48, 38, 744; 359/451
See application file for complete search history.

(56) References Cited

U.S. PATENT DOCUMENTS

| | | | |
|---|---|---|---|
| 5,724,775 A | * 3/1998 | Zobel et al. | 52/82 |
| 2001/0040671 A1 | * 11/2001 | Metcalf | 353/94 |
| 2007/0009862 A1 | * 1/2007 | Quinn et al. | 434/38 |
| 2007/0188493 A1 | * 8/2007 | Kondo et al. | 345/427 |
| 2010/0300006 A1 | 12/2010 | Magpuri | |

* cited by examiner

*Primary Examiner* — William C Dowling
*Assistant Examiner* — Magda Cruz
(74) *Attorney, Agent, or Firm* — H. John Rizvi; Gold & Rizvi P.A.

(57) ABSTRACT

An audiovisual presentation system includes a transparent system enclosure and at least one projector outside the system enclosure and generally directed toward an exterior surface of the system enclosure. The system enclosure is formed in a dome shape, a hemispherical shape, a spherical shape, or any other reasonable shape. The system can include a plurality of projectors to present individual images or can be computer altered to present a continuous, panoramic image. The image can be of any quality or format, including high definition (HD) three-dimensional (3D), and others. A plurality of audiovisual input stations may be disposed about an interior of the enclosure. Each station may include a podium, a computer, a video recorder, an audio device, and a user control interface. The station enables the user to manipulate the video camera and/or the video image as desired.

19 Claims, 14 Drawing Sheets

AUDIOVISUAL PRESENTATION SYSTEM COMPRISING AN ENCLOSURE SCREEN AND OUTSIDE PROJECTORS DIRECTED TOWARDS THE ENCLOSURE SCREEN

FIELD OF THE INVENTION

The disclosure generally relates to systems for presenting media in an audiovisual format. More particularly, the disclosure relates to an audiovisual presentation system, which provides an individual or group with an enhanced capacity to manipulate and experience audiovisual media in a realistic manner.

BACKGROUND OF THE INVENTION

A variety of audiovisual presentation devices are known in the art for presenting audiovisual media to an audience. These include audiovisual input station computers as well as large-televisions and projectors. In a conventional audiovisual presentation, images are presented or displayed on a flat rectangular screen. Presentations may range from simple visual displays used in lectures and speeches to video conferences in which persons at remote locations can view and interact with each other through audio and visual images on the screen. Movies and films attempt to enable an audience to re-live the experiences of actors on screen. However, the limited-area two-dimensional rectangular screen detracts from a sense of realism, which characterizes genuine personal interactions and experiences, which the presenter may desire to convey to his or her audience through a presentation. Moreover, conventional audiovisual presentation devices are limited in their capacity to enable presenters or audiences to manipulate various aspects of the audio or visual medium.

Accordingly, an audiovisual presentation system that provides an individual or group with an enhanced capacity to manipulate and experience audiovisual media in a realistic manner is needed.

SUMMARY OF THE INVENTION

The disclosure is generally directed to an audiovisual presentation system that provides an individual or group with an enhanced capacity to manipulate and experience audiovisual media in a realistic manner. An illustrative embodiment of the audiovisual presentation system includes a transparent system enclosure and at least one projector outside the system enclosure and generally directed toward an exterior surface of the system enclosure.

According to one aspect of the audiovisual presentation system, each projector may interface with the Internet.

According to another aspect of the audiovisual presentation system, a remote computer may interface with each projector and a video recorder may interface with the remote computer.

According to still another aspect of the audiovisual presentation system, the system enclosure may include an enclosure dome.

According to another aspect of the audiovisual presentation system, the video may be generated, transformed, and presented as a panoramic image, providing a virtual reality experience for the user.

According to yet another aspect of the audiovisual presentation system, the enclosure dome may include a plurality of enclosure dome panels.

According to another aspect of the audiovisual presentation system, the enclosure dome may extend from an enclosure base.

According to a still further aspect of the audiovisual presentation system, the system enclosure may include an enclosure sphere.

According to yet another aspect of the audiovisual presentation system, the enclosure sphere may be seated in the enclosure cradle.

According to another aspect of the audiovisual presentation system, the video may be presented in a three-dimensional (3D) format. The projected 3D image may be enhanced by utilizing a pair of projectors, wherein a first image is projected to focus on a first surface of the system enclosure, and a second image is projected to focus on a second surface of the system enclosure.

These and other aspects, features, and advantages of the present disclosure will become more readily apparent from the attached drawings and the detailed description of the illustrative embodiments, which follow.

BRIEF DESCRIPTION OF THE DRAWINGS

Illustrative embodiments of the disclosure will hereinafter be described in conjunction with the appended drawings provided to illustrate and not to limit the appended claims, where like designations denote like elements, and in which:

DETAILED DESCRIPTION OF THE REPRESENTATIVE EMBODIMENTS

Figure 1:
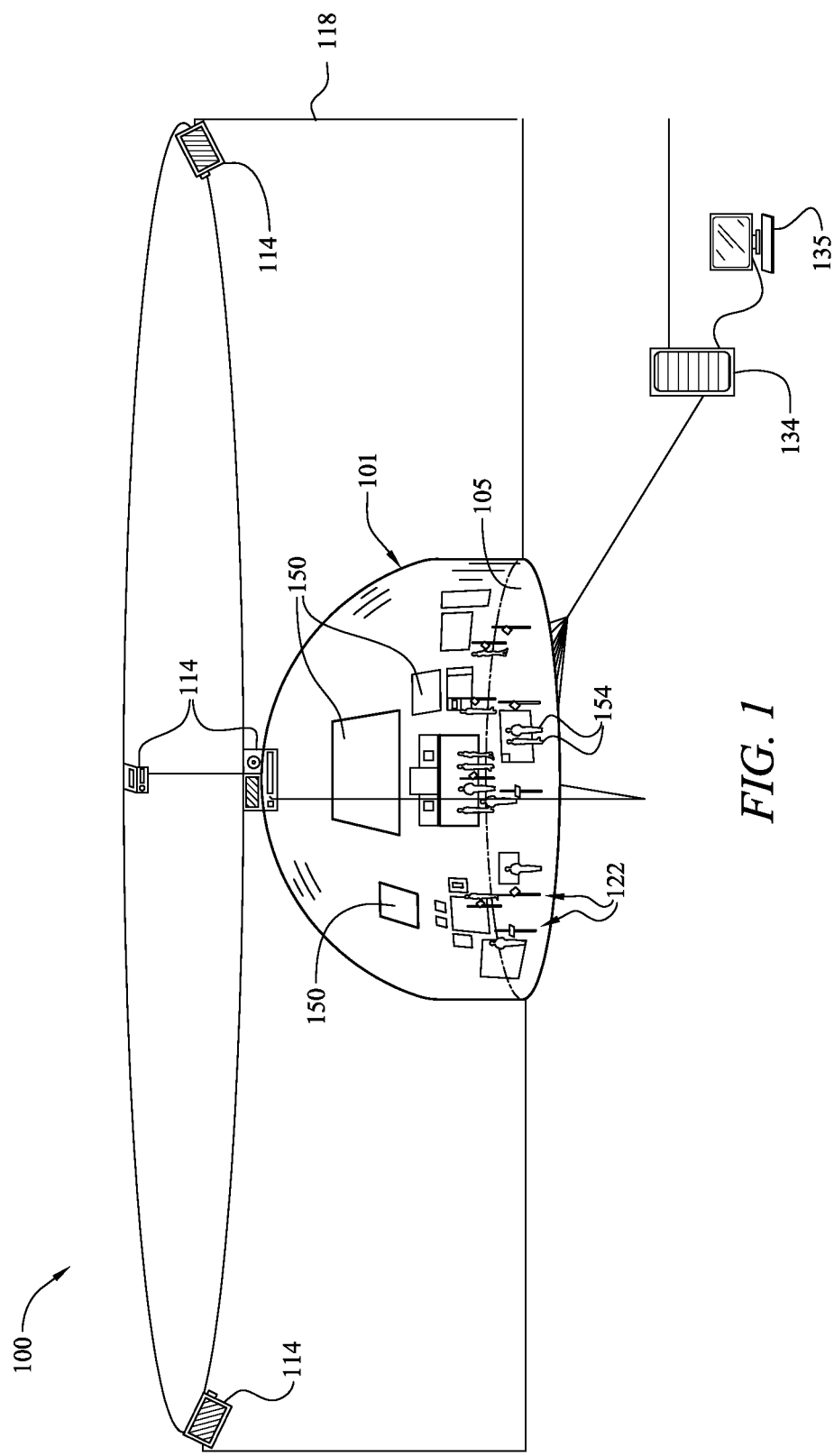
FIG. 1 is a side view of an illustrative embodiment of the audiovisual presentation system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings, an illustrative embodiment of an audiovisual presentation system, which provides an individual or group with an enhanced capacity to manipulate and experience audiovisual media in a realistic manner, is generally indicated by reference numeral 100. As will be hereinafter described, in some applications, the audiovisual presentation system 100 may enable an individual or group to visually re-live an experience that was previously captured by a video capture device. In some applications, the audiovisual presentation system 100 may provide a means for visual transportation of an individual or group to a remote location and interact with individuals and/or objects at that location live and in a realistic manner. In some applications, the audiovisual presentation system 100 may enable telepresence interactions by an individual or group to take place and simultaneously allow the individual or group with the flexibility to alter the size and other parameters of video images which are displayed at will to suit the needs and desires of the individual or group.

Referring initially to FIGS. 1 and 3-5 of the drawings, the audiovisual presentation system 100 includes a system enclosure 101. An enclosure floor 105 may be provided in a lower portion of the system enclosure 101. In some embodiments, the system enclosure 101 may have a generally dome-shaped configuration, as illustrated. The structural details of the system enclosure 101 will be hereinafter described. At least one projector 114 is provided exterior to the system enclosure 101. Each projector 114 is oriented or aimed toward the system enclosure 101. In some embodiments, multiple projectors 114 may be provided exterior to the system enclosure 101 at selected positions with respect to the system enclosure 101. For example and without limitation, four projectors 114 may be disposed at 90-degree relationship with respect to each other around the system enclosure 101, as illustrated. In other embodiments, a greater or lesser number of projectors 114 may be positioned at various locations around the exterior of the system enclosure 101. In some embodiments, each projector 114 may be an ultra-high definition (16 times HD) laser video projector, a three-dimensional (3-D) video projector arrangement, or the like. In alternative embodiments, other types of projectors known by those skilled in the art may be used. The projectors 114 may be supported by a projector support structure 118, which is suitable for supporting and positioning the projectors 114. Each projector 114 may be adapted to project a video image 150 onto the exterior surface of the system enclosure 101. The video image 150 is visible from inside the system enclosure 101 as will be hereinafter described.

Figure 5:
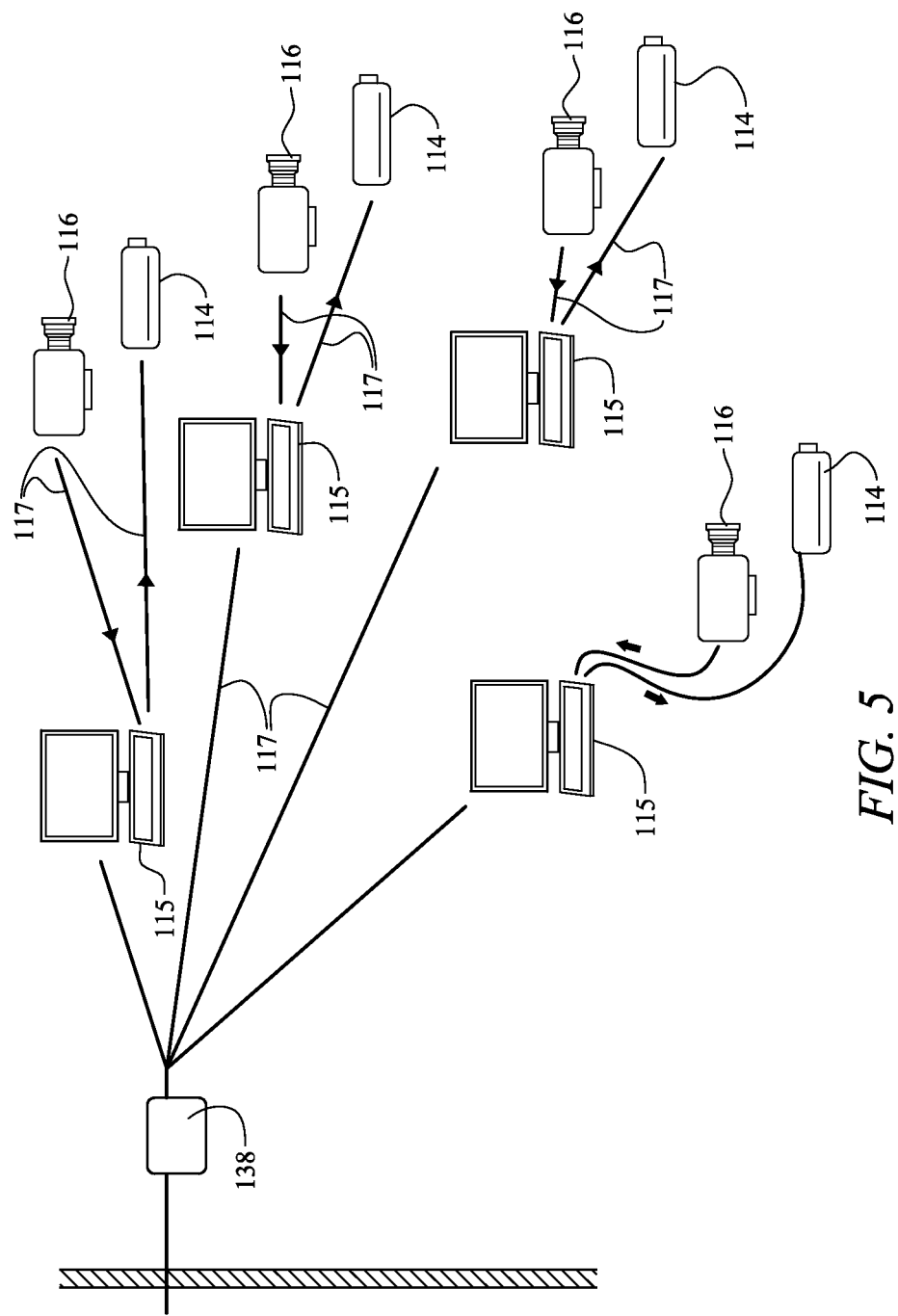
FIG. 5 is a schematic diagram which illustrates exemplary connection of video projectors and video recorders to the Internet via remote computers.

As illustrated in FIG. 5, a remote computer 115 may interface with each projector 114 and a video recorder 116 may interface with the remote computer 115 through input/output cables 117. In some embodiments, the video recorder 116 may high-definition (or greater) video capture device known in the art. In some embodiments, the video recorder 116 may include at least one 3D video capture device and may further include at least one audio capture device. The remote computer 115 may interface with the Internet 138 for communication and audiovisual data transportation purposes as will be hereinafter described. Accordingly, the remote computer 115 may be loaded with hardware and software, which are necessary to send and receive video and audio data to and from remote locations via the Internet 138. In some applications, each video recorder 116 may be located inside the system enclosure 101 for the purpose of capturing audio and video from one or more users 154 inside the system enclosure 101 and transmitting the audio and video to a person or persons who is/are at a remote location via the Internet 138. In some embodiments, the video recorder 116 may be an immersive video capture device.

Figure 4:
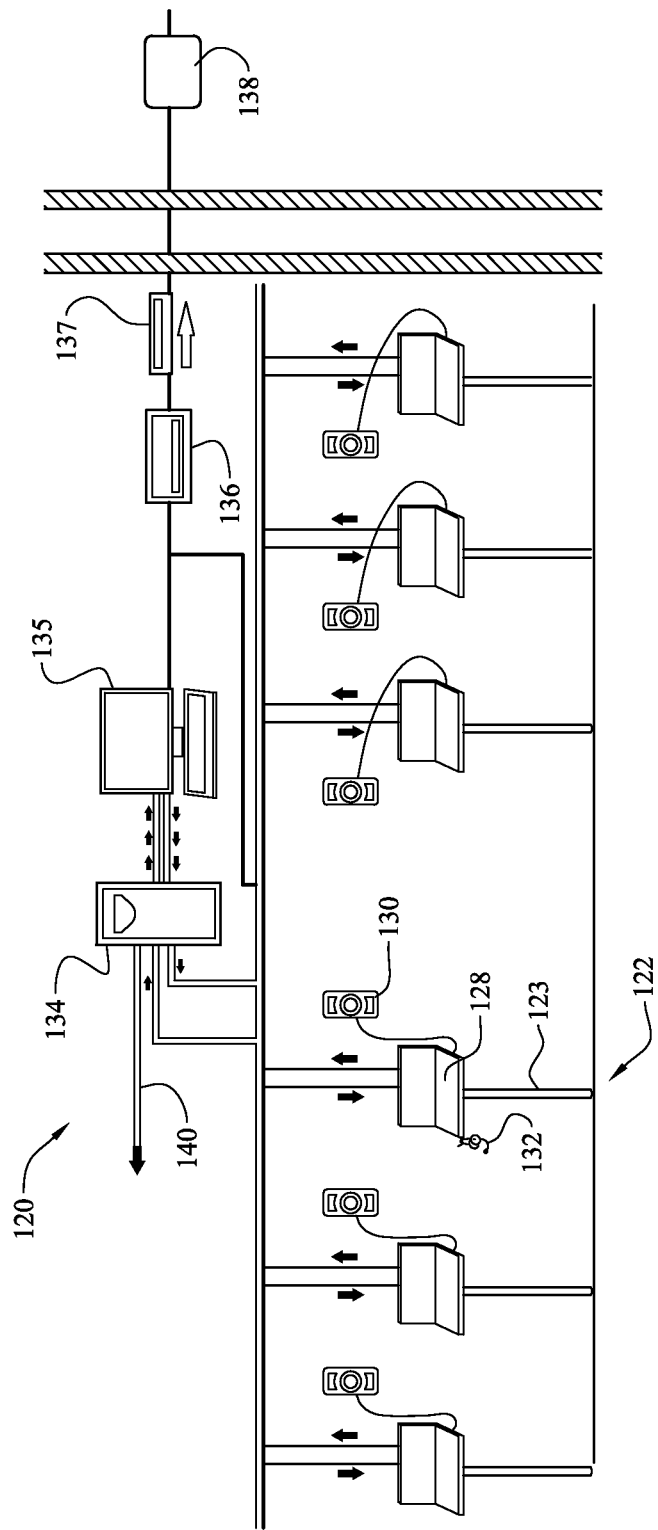
FIG. 4 is a schematic diagram which illustrates multiple audiovisual input stations with various functional components interfacing with the audiovisual input stations.

As illustrated in FIG. 4, in some embodiments, an audio visual input system 120 may interface with the projectors 114 and the Internet 138. The audio visual input system 120 may enable a user or users of the audiovisual presentation system 100 to manipulate audiovisual data which is captured by the projectors 114 as well as receive audiovisual data from a remote location and transmit audiovisual data to a remote location via the Internet 138. The audio visual input system 120 may include at least one server 134 that interfaces with the projectors 114 through at least one projector input 140. A network monitor 135 may interface with the servers 134. In some embodiments, telepresence hardware and software 136 may interface with the network monitor 135. Intrusion detection hardware 137 may interface with the telepresence hardware and software 136 and the Internet 138.

Figure 2:
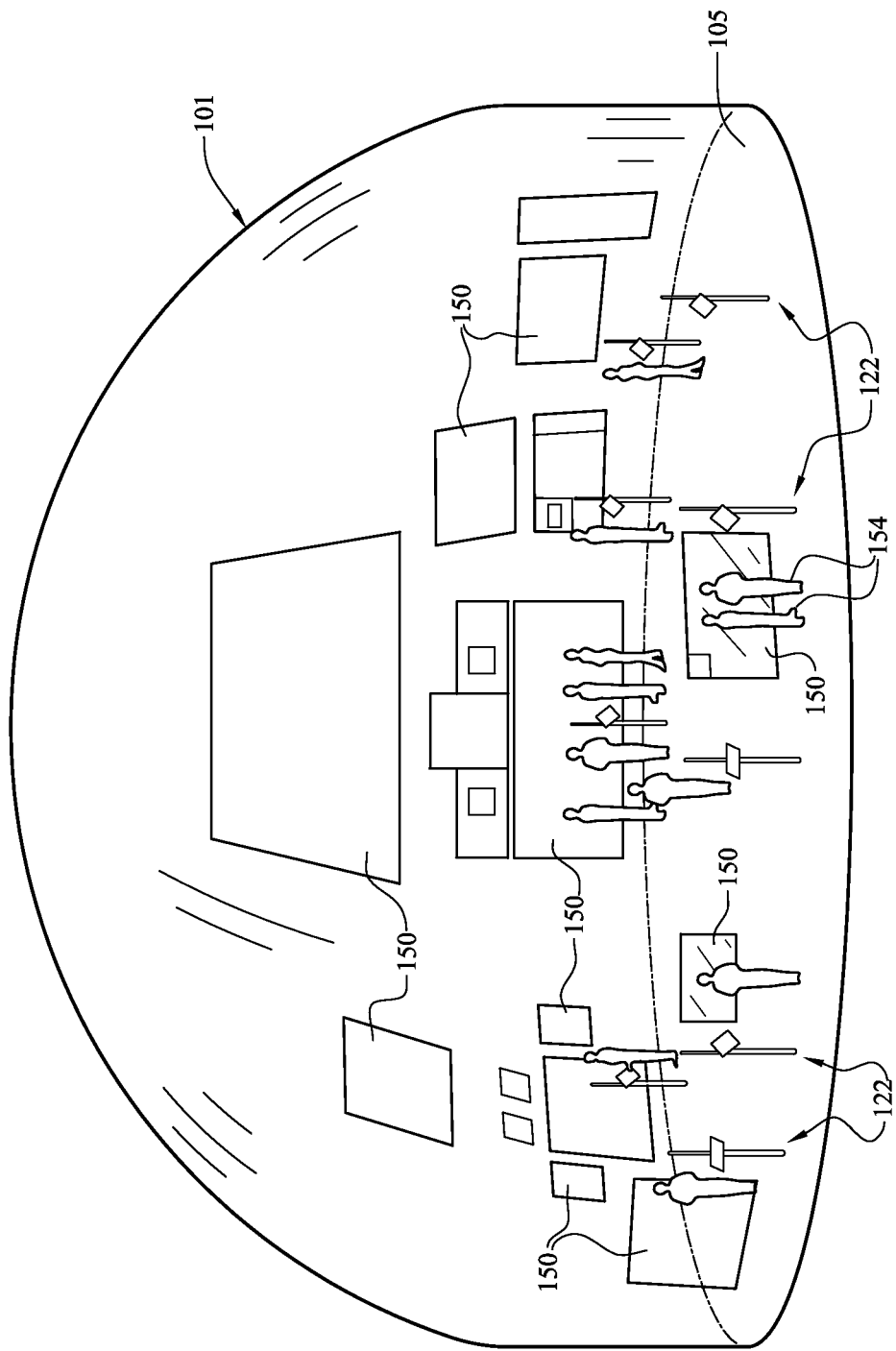
FIG. 2 is a side view of a dome-shaped system enclosure of the audiovisual presentation system.
Figure 3:
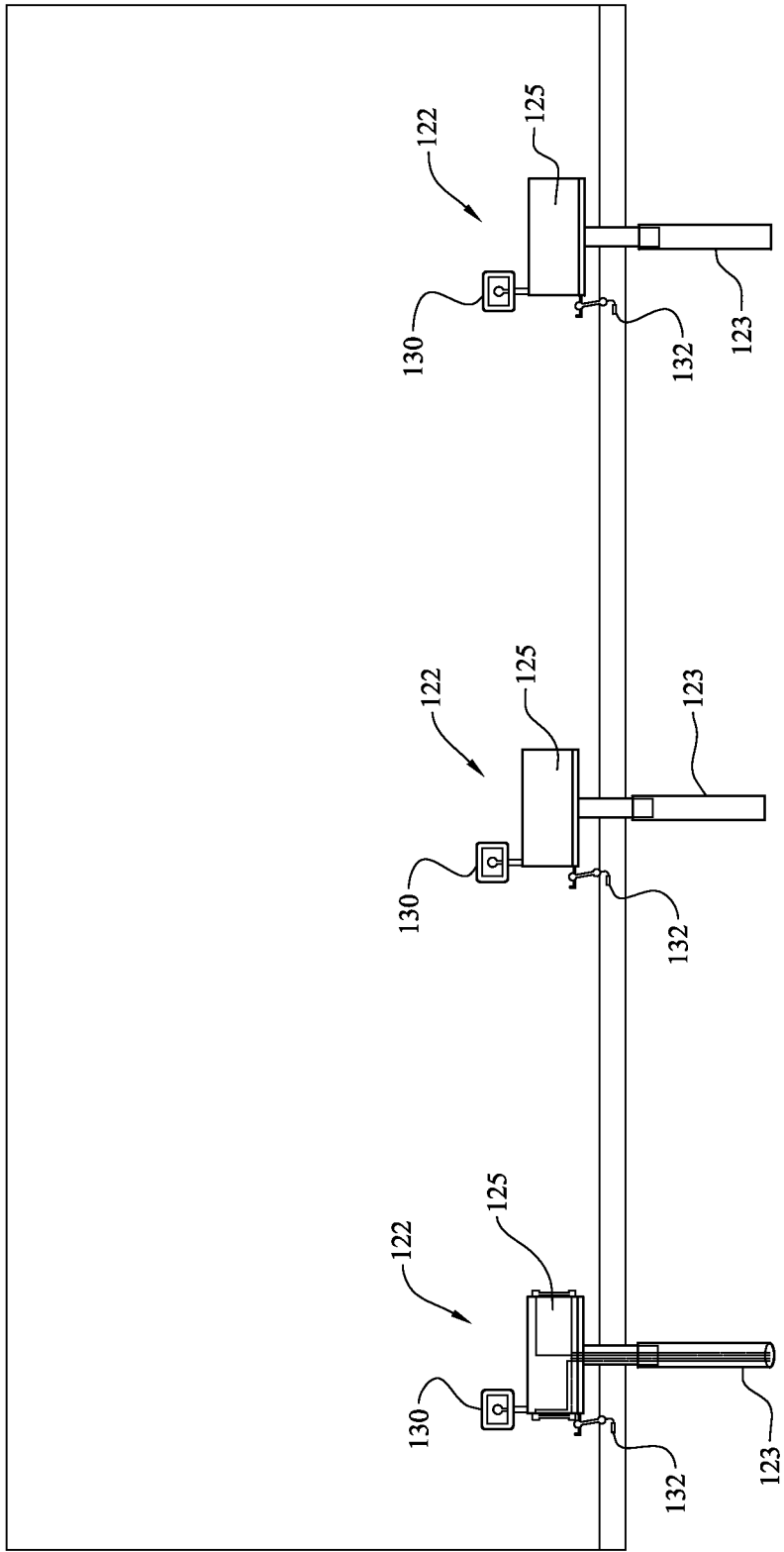
FIG. 3 is a front view of multiple audiovisual input stations.

As further illustrated in FIG. 4, multiple audiovisual input stations 122 may interface with the network monitor 135. As illustrated in FIG. 2, the audiovisual input stations 122 may be located inside the system enclosure 101 of the audiovisual presentation system 100. As illustrated in FIG. 3, each audiovisual input station 122 may include a podium 123 having a computer support 124 and at least one port 125. The port 125 may facilitate connection of each audiovisual input station 122 to a computer network (not illustrated), an audiovisual input station computer 128 and/or a keyboard (not illustrated) or a mouse (not illustrated). A keyboard and/or a mouse may be connected to the port 125 to facilitate selection of an item from a menu listed on the video image 150 and/or to facilitate other alteration of the video image 150 according to the preferences of the user 154. Each podium 123 may also include an audio device 132. The audio device 132 may be adapted to interface with the audiovisual input station computer 128 or with a port 125. As illustrated in FIG. 4, the computer support 124 (FIG. 3) of each podium 123 may be adapted to support the audiovisual input station computer 128. A video capture device 130 may interface with the audiovisual input station computer 128 at each podium 123. Each projector 114 may be designated for a corresponding audiovisual input station 122. In some embodiments, the audiovisual input station computer 128 may include a laptop computer.

Referring next to FIGS. 6-8 and 12 of the drawings, in some embodiments, the system enclosure 101 of the audiovisual presentation system 100 may include a generally annular or cylindrical enclosure base 102 and a generally hemispherical enclosure dome 106 on the enclosure base 102. The enclosure base 102 may be fabricated from multiple, adjacent enclosure base panels 103. Likewise, the enclosure dome 106 may be fabricated from multiple, adjacent enclosure dome panels 107. Each of the enclosure base panels 103 and the enclosure dome panels 107 may be generally rectangular and may be a rigid acrylic rear projection screen known by those skilled in the art. The enclosure base 102 may be formed by joining prefabricated sections of the enclosure base panels 103. The enclosure dome 106 may be formed by joining prefabricated sections of the enclosure dome panels 107.

Figure 6:
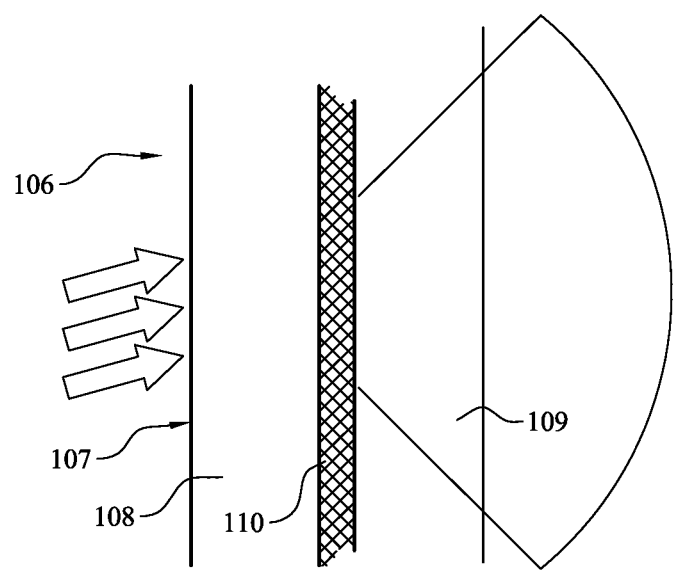
FIG. 6 is an enlarged sectional view of a side wall of the system enclosure.
Figure 7:
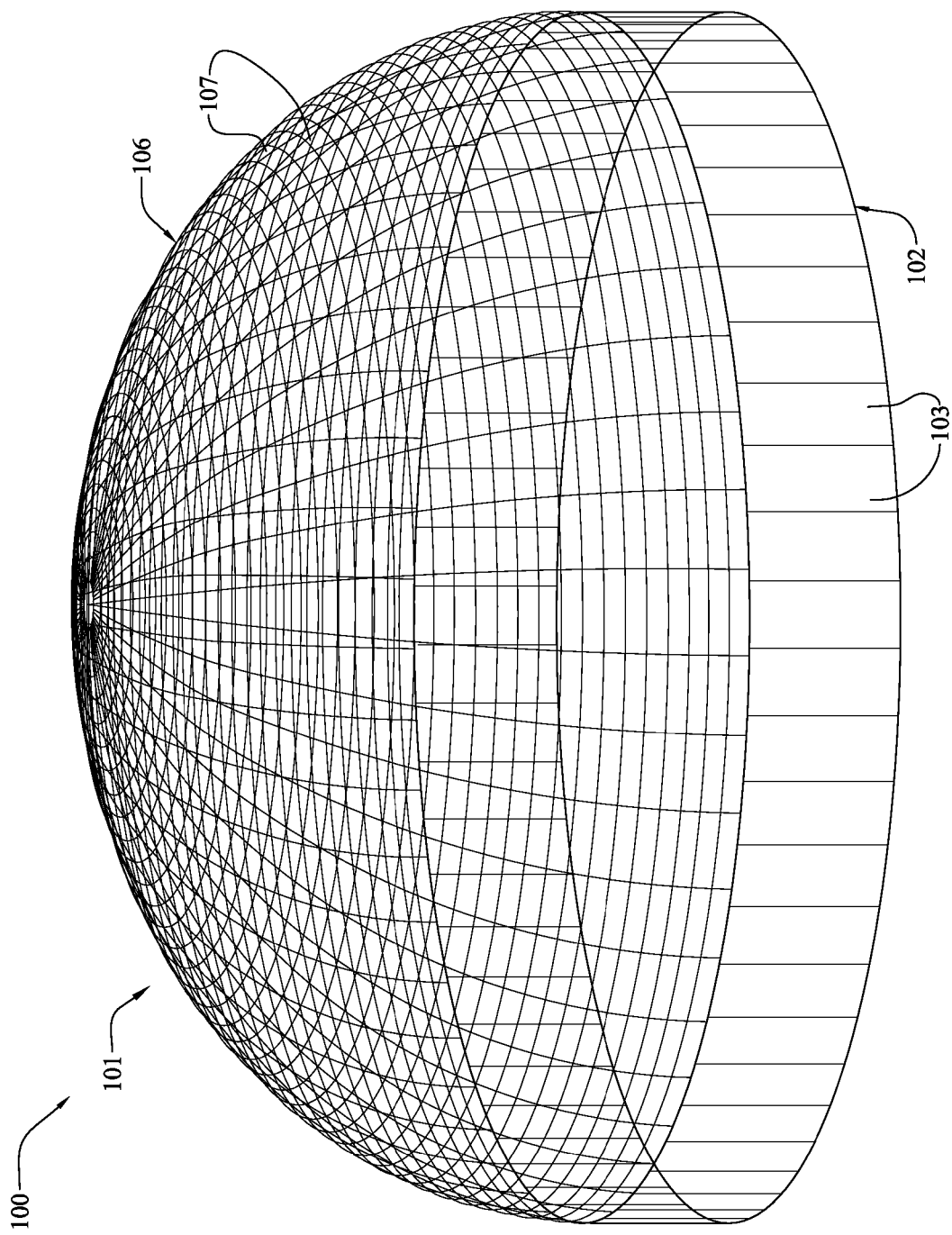
FIG. 7 is a perspective view of a multi-panel design for a dome-shaped system enclosure according to an illustrative embodiment of the audiovisual presentation system.
Figure 8:
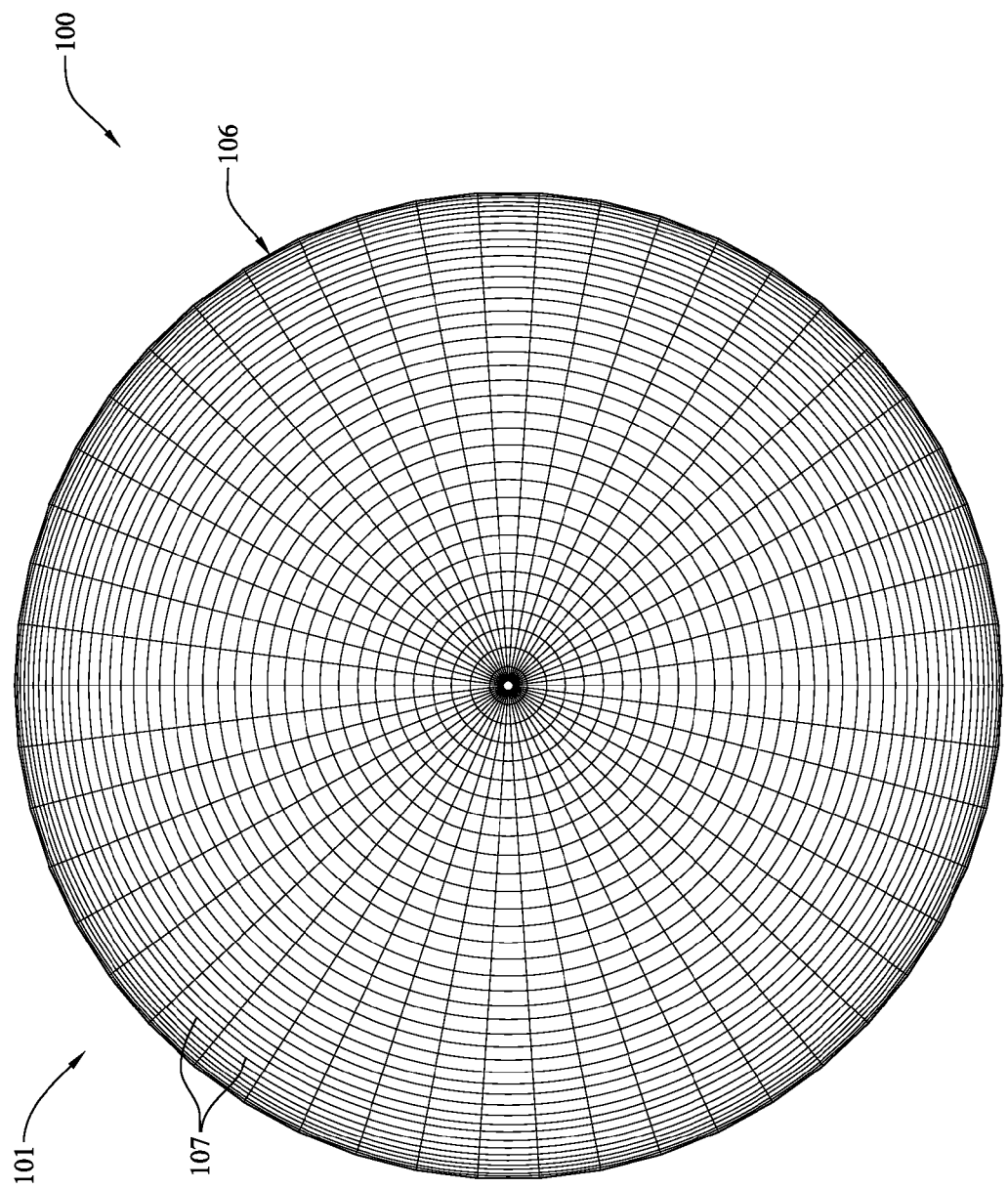
FIG. 8 is a top view of the multi-panel system enclosure illustrated in FIG. 7.
Figure 12:
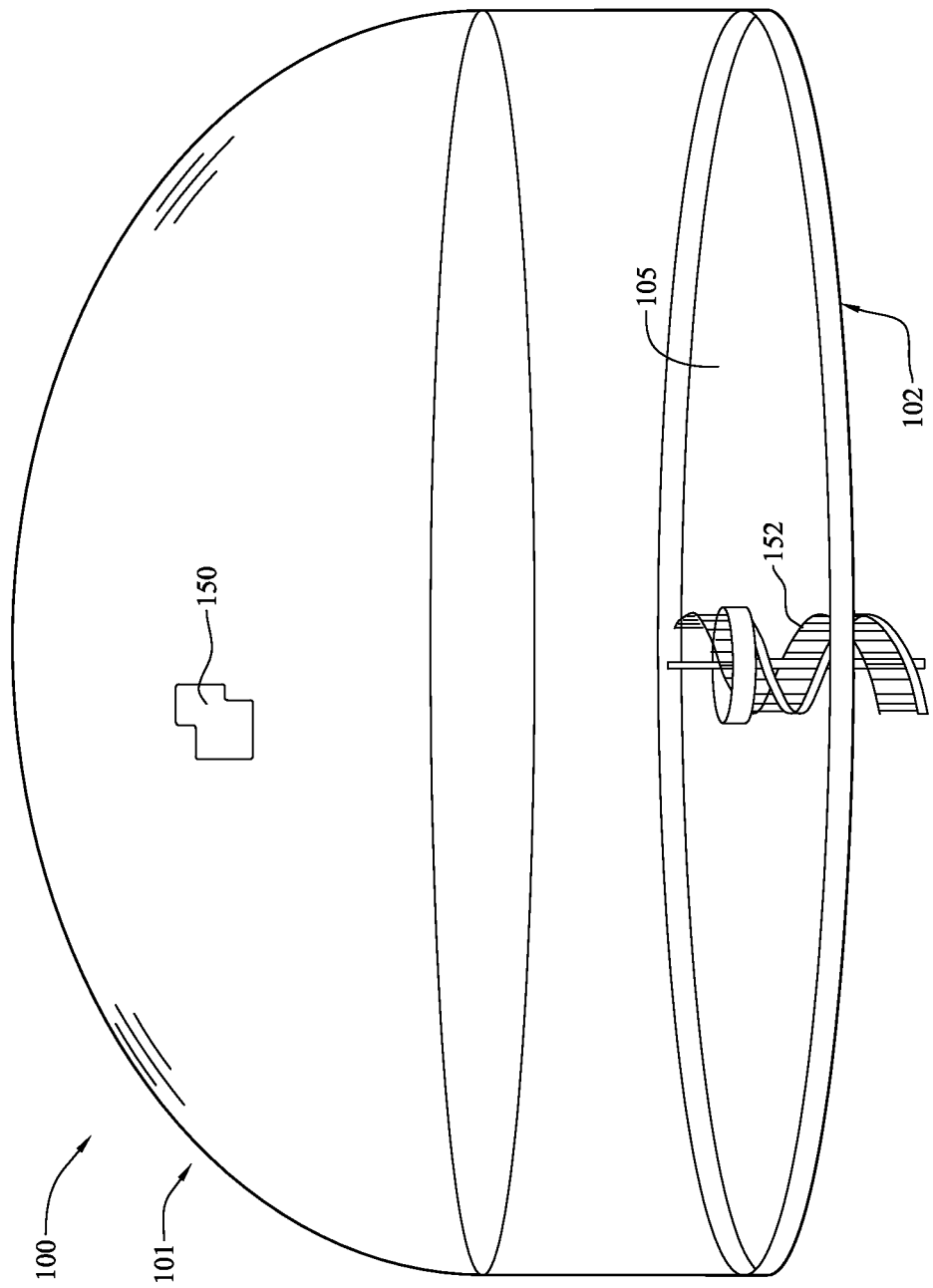
FIG. 12 is a perspective view of a system enclosure, with stairs providing access to the interior of the system enclosure.

As illustrated in FIG. 6, each enclosure dome panel 107 of the enclosure dome 106 (and each enclosure base panel 103 of the enclosure base 102) may include an exterior panel portion 108 and an internal panel portion 109. Each of the exterior panel portion 108 and the internal panel portion 109 may be a clear cell cast acrylic panel or other suitable transparent material. A diffuser screen material 110 may be sandwiched between the exterior panel portion 108 and the interior panel portion 109. In some embodiments, the diffuser screen material 110 may be a BLUE OCEAN® multi-scattering diffuser screen material. As illustrated in FIG. 12, in some embodiments, stairs 152 such as a spiral staircase, as illustrated, may be provided beneath the enclosure floor 105 to provide access to the system enclosure 101 from beneath. The internal panel portions 109 of the enclosure dome panels 107 may impart a smooth interior screen surface to the enclosure dome 106.

Figure 9:
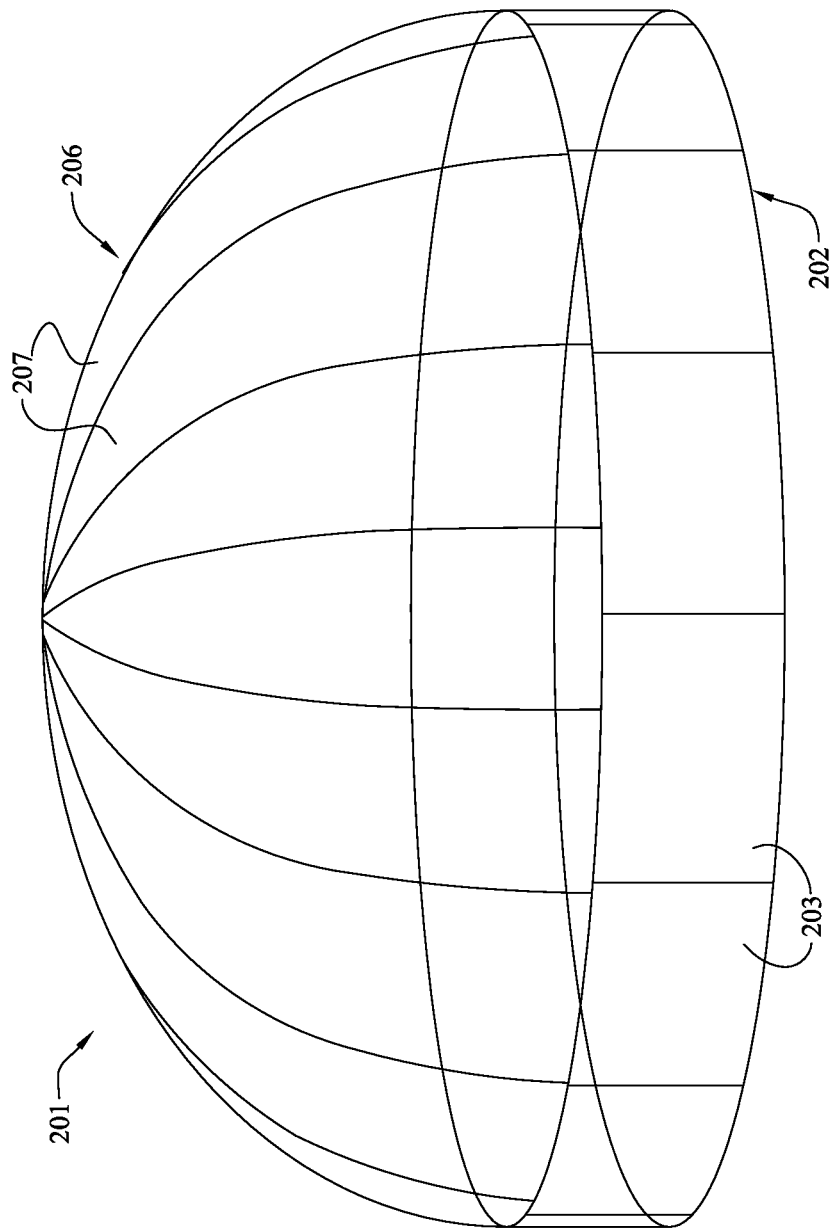
FIG. 9 is a perspective view of an alternative multi-panel design for the system enclosure.

Referring next to FIG. 9 of the drawings, a system enclosure 201 of an alternative illustrative embodiment of the audiovisual presentation system 100 (FIG. 1) includes an enclosure base 202 which may include a single row of generally rectangular enclosure base panels 203. The enclosure dome 206 of the system enclosure 201 may include multiple curved or arched enclosure dome panels 207 which extend from the enclosure base 202 to the top of the enclosure dome 206.

Figure 10:
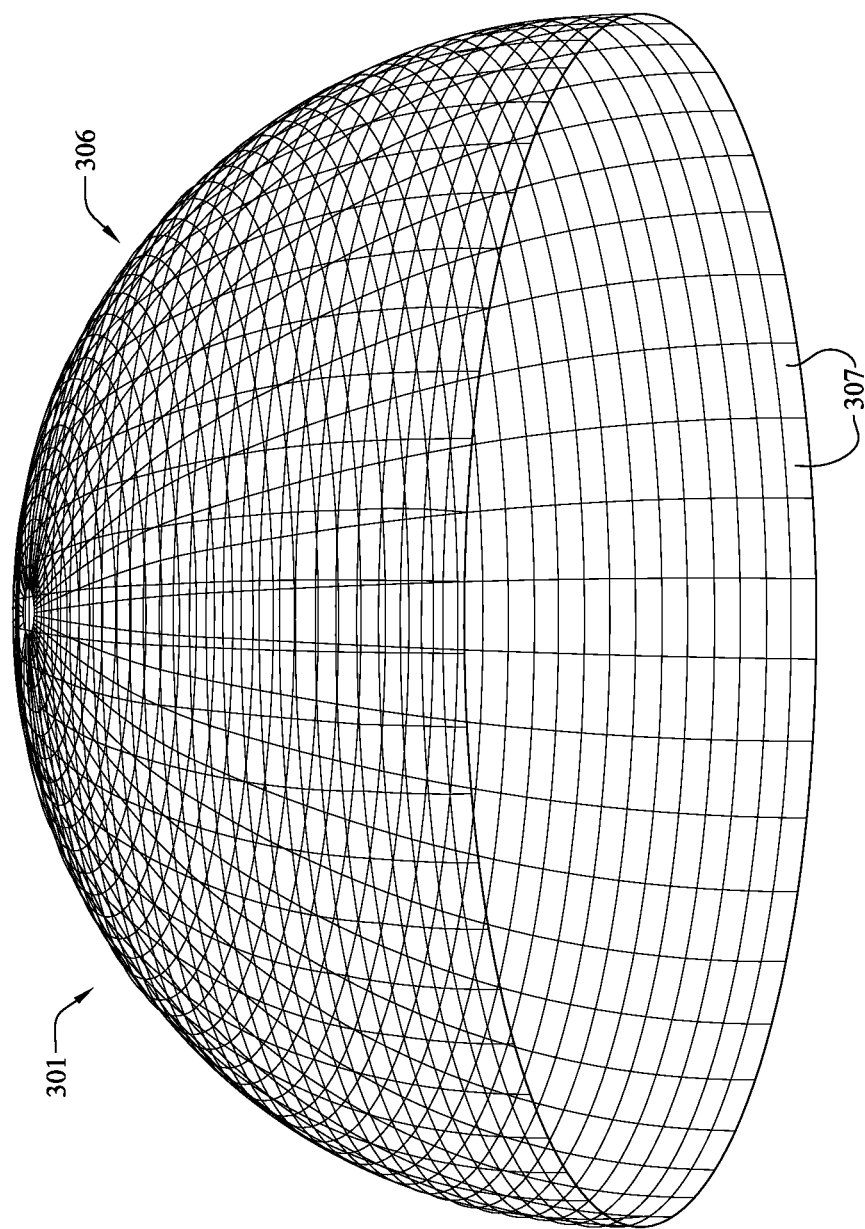
FIG. 10 is a perspective view of another alternative multi-panel design for the system enclosure.

Referring next to FIG. 10 of the drawings, a system enclosure 301 of another alternative illustrative embodiment of the audiovisual presentation system 100 includes a generally hemispherical enclosure dome 306. The enclosure dome 306 may be fabricated from multiple enclosure dome panels 307 each of which may be generally rectangular. An enclosure base (not illustrated) may be omitted from the enclosure dome 306.

Figure 11:
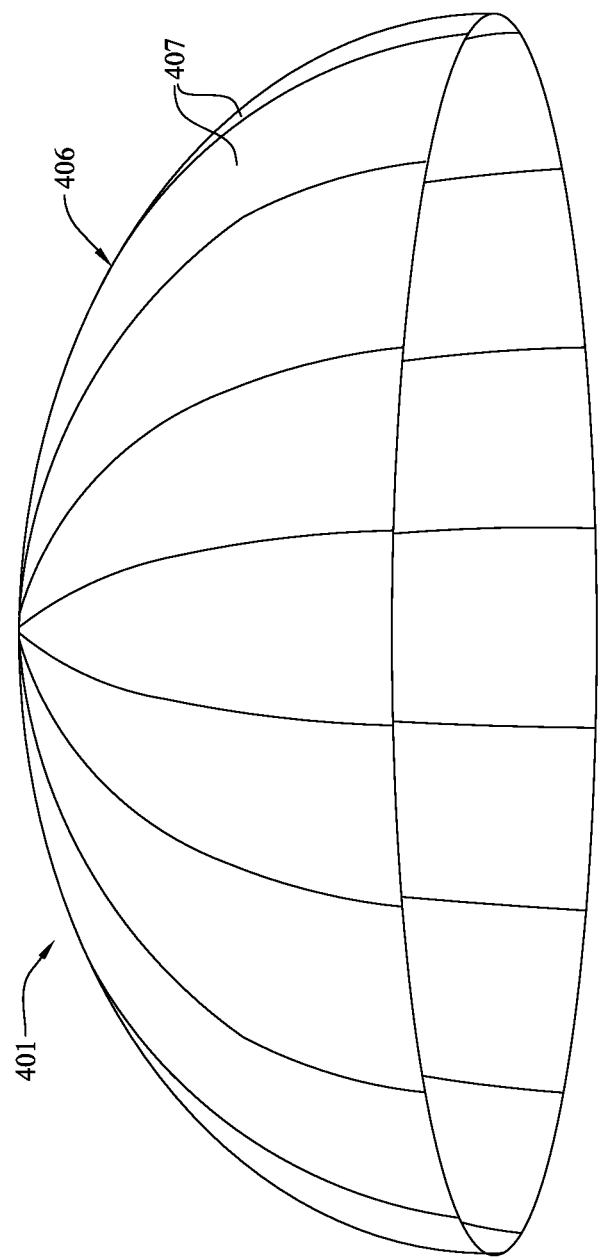
FIG. 11 is a perspective view of still another alternative multi-panel design for the system enclosure.

Referring next to FIG. 11 of the drawings, a system enclosure 401 of another alternative illustrative embodiment of the audiovisual presentation system 100 includes a generally hemispherical enclosure dome 406. The enclosure dome 406 may be fabricated from multiple enclosure dome panels 407 each of which may arch or curve from a lower edge to the top of the enclosure dome 406.

Figure 13:
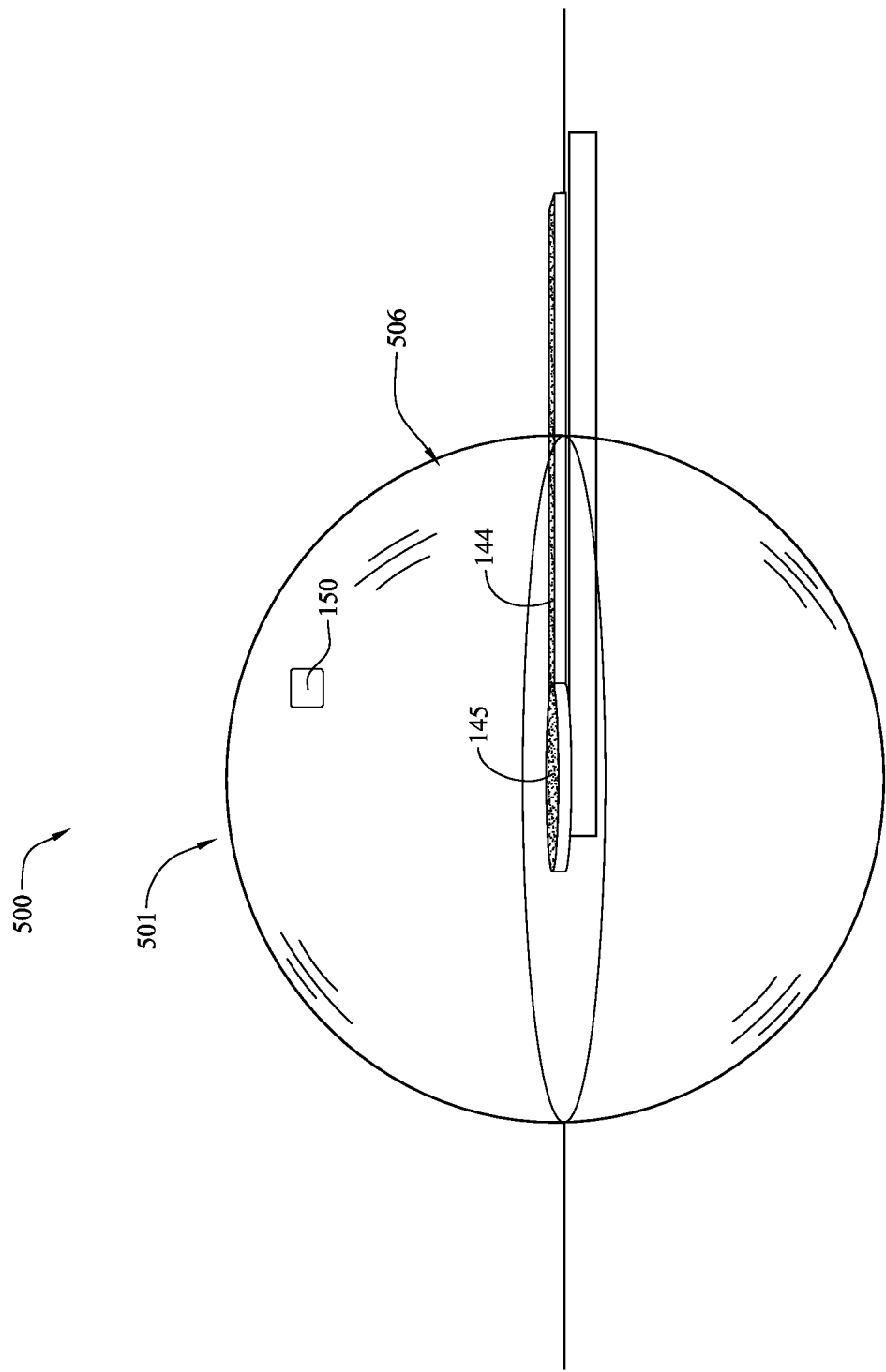
FIG. 13 is a perspective view of a spherical system enclosure of another illustrative embodiment of the audiovisual presentation system.

Referring next to FIG. 13 of the drawings, an alternative illustrative embodiment of the audiovisual presentation system 500 includes a system enclosure 501 having an enclosure sphere 506. A walkway 144 may extend into the enclosure sphere 506. A platform 145 may be provided on the walkway 144. Accordingly, a participant or group (not illustrated) may enter the enclosure sphere 506 on the walkway 144 and view the projected video image or images 150 while standing on the platform 145. In some embodiments, the enclosure sphere 506 may have the same multi-paneled construction, which was heretofore described with respect to the enclosure dome 106 of the audiovisual presentation system 100, which was heretofore described with respect to FIGS. 1-8.

Figure 14:
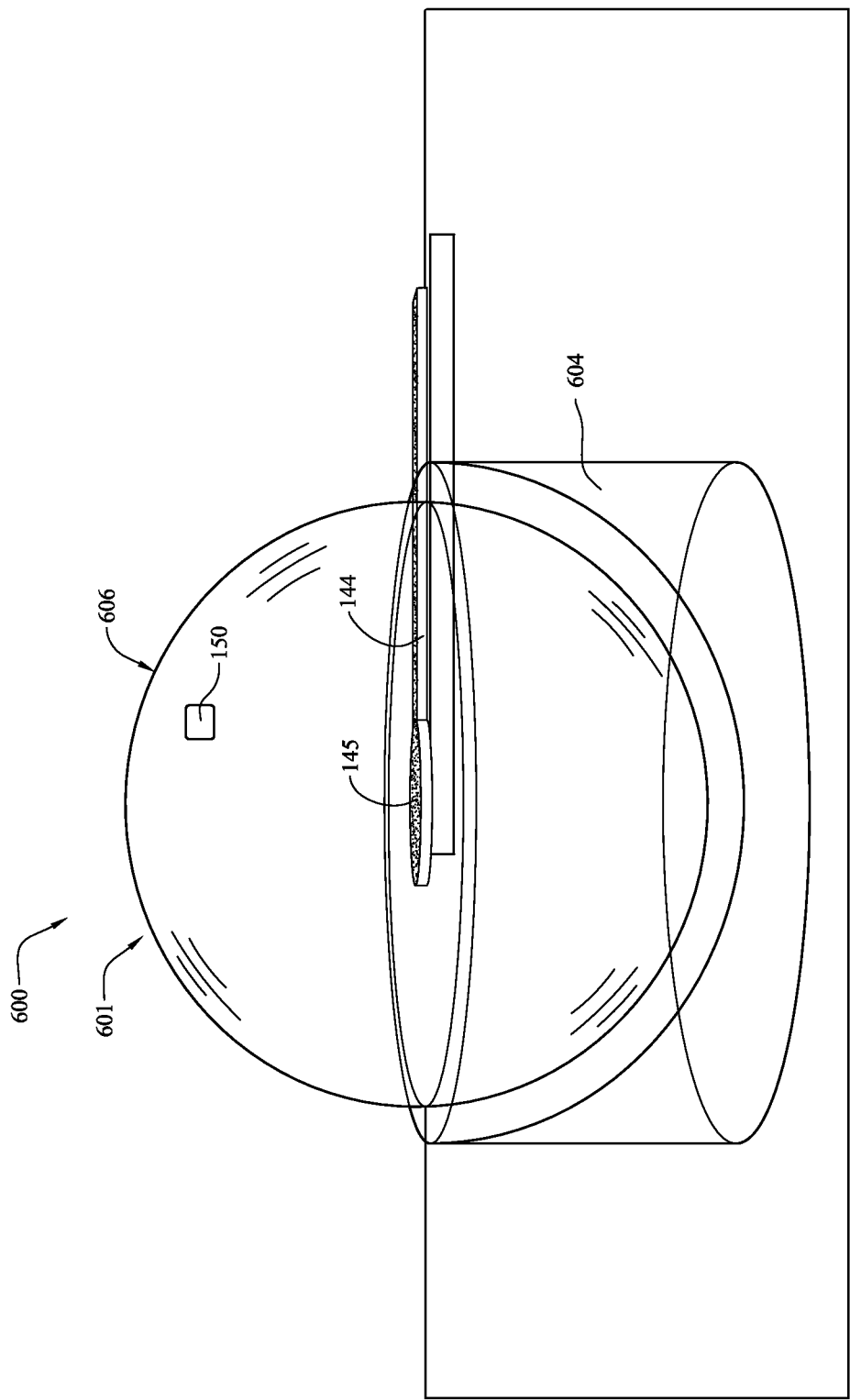
FIG. 14 is a perspective view of a spherical system enclosure of another illustrative embodiment of the audiovisual presentation system, with the spherical system enclosure supported by an enclosure cradle.

Referring next to FIG. 14 of the drawings, another alternative illustrative embodiment of the audiovisual presentation system 600 includes a system enclosure 601 having an enclosure sphere 606. A walkway 144 may extend into the enclosure sphere 606 on which is provided a platform 145 may be provided on the walkway 144, as was heretofore described with respect to the audiovisual presentation system 500 in FIG. 13. An enclosure cradle 604 may support the enclosure sphere 606 in an upright position. The enclosure cradle 604 may have a generally cylindrical or alternative shape that is suitable for the purpose of supporting the enclosure sphere 606 in an upright position.

Referring next to FIGS. 1, 2, 4 and 5 of the drawings, in exemplary application, the audiovisual presentation system 100 is operable to present at least one video image 150 to at least one user 154 who typically stands on the enclosure floor 105 in the system enclosure 101. At least one projector 114 projects at least one video image 150 onto the exterior surface of the system enclosure 101. Each video image 150 is visible to the users 154 on the interior surface of the system enclosure 101. Audio, which accompanies each video image 150, may be transmitted to the audio device 132 (FIG. 4) at each audiovisual input station 122. In some embodiments, speakers (not illustrated) may be provided in the system enclosure 101 to broadcast the audio to the users 154.

In one exemplary embodiment, the plurality of video images 150 are generated and edited to project a continuous panoramic video image about the surface of the system enclosure 101. The continuous panoramic video image can be displayed about the entire surface, a ring about the surface, an upper portion of the surface, and the like to create a virtual environment for the viewing party 154.

Each video image 150 may be live feed or recorded in the form of still images, manufactured images or virtual images or environments. Audio and video data is accessed from one or more of the video recorders 116 (FIG. 5), one or more of the audiovisual input station computers 128 (FIG. 4), one or more of the remote computers 115 (FIG. 5) and/or any other information storage device or remote source. The video data may be warped and blended using electronic hardware and software to facilitate correct display of the video image 150 on the curved contour of the system enclosure 101. One of more of the projectors 114 then displays the video image 150 onto the exterior surface of the system enclosure 101 such that the video image 150 is visible from inside the system enclosure 101. The audio data, which accompanies the video data, may be transmitted to the audio devices 132 (FIG. 3) at the podiums 123 of the respective audiovisual input stations 122. Additionally or alternatively, the audio data may be transmitted to each of one or multiple speakers (not illustrated) in the system enclosure 101.

In some applications, a video projector 114 may be designated for each audiovisual input station 122 inside the system enclosure 101. Therefore, the video images 150 which appear on the interior surface of the system enclosure 101 may correspond in number and position to the respective audiovisual input stations 122 in the system enclosure 101. An audiovisual input station computer 128 (FIG. 4) may be placed on the computer support 124 (FIG. 3) at the podium 123 of each audiovisual input station 122 and connected to the corresponding port 125. Each user 154 may stand at an audiovisual input station 122. Accordingly, using the audiovisual input station computer 128, each user 154 can selectively manipulate the video image 150 which is emitted by the projector 114 corresponding to that audiovisual input station 122, or which is received via the Internet 138, according to the preferences of the user. Thus, the user 154 may be able to control such parameters as the size, brightness and contrast of the video image 150 that corresponds to his or her audiovisual input station 122. In a similar manner, each user 154 may also be able to selectively manipulate the audio that is received through the audio device 132 at each audiovisual input station 122 according to his or her preferences. In some applications, each audio device 132 may enable each user 154 to carry out private conversations and interactions with individuals (not illustrated) located at a remote location.

In some embodiments, one or more of the audiovisual input station computers 128 (FIG. 4), one or more of the remote computers 115 (FIG. 5) and/or any other information storage device or remote source may be loaded with software necessary to warp, edge-bend or otherwise manipulate video content such that the video image 150 displays correctly over the surface of the system enclosure 101 and/or sections of the system enclosure 101. Each audiovisual input station computer 128 may also be loaded with graphics software and other software that may be necessary to impart the necessary graphics and other format to the images displayed in the video image 150. In some applications, the video image 150 may be controlled by a network administrator (not illustrated) who may access the audiovisual presentation system 100 via the network monitor 135 (FIG. 4) of the audiovisual input system 120.

In some applications, the video image 150 may include images of an experience that was previously captured and recorded by the video recorder 116 (FIG. 5), an immersive video capture device, or other video capture device. Therefore, the audiovisual presentation system 100 may enable the users 154 to re-live the experience recorded by the video recorder 116. In other applications, the video image 150 may include images of a remote location along with one or more persons and/or objects at the remote location. The images of the person(s) and/or object(s) at the remote location may be captured using a high-definition 3D video capture device known by those skilled in the art. The telepresence hardware and software 136 (FIG. 4) of the audiovisual input system 120 may enable telepresence interactions in which the users 154 interact visually and verbally with the person or persons and/or objects at the remote location. In such applications, the images of the remote location and the persons and/or objects at the remote location may be transmitted to each projector 114 via the Internet 138. Additionally, video images and audio, which are captured and recorded by each video recorder 130, may be transmitted from the users 154 to the person or persons at the remote location via the Internet 138. In the foregoing manner, the audiovisual presentation system 100 may facilitate videoconferencing sessions between the users 154 in the system enclosure 101 and the person or persons at the remote location.

The video image 150 can be presented from a pair of projectors; the first being focused on an interior surface of the system enclosure 101 and the second being focused an exterior surface of the system enclosure 101 to enhance a 3D image. The thickness of the material of the system enclosure 101 relates to the perceived distance between the two images, thus enhancing the 3D experience.

It will be appreciated by those skilled in the art that the various embodiments of the audiovisual presentation system described herein are amenable to a variety of diverse applications or simulations of activities or experiences. Some of these applications and simulations include but are not limited to ambulance paramedic assistance, architecture (site plan analysis, space planning, interior design, structural aspect review, 3D architecture and urban planning), arctic exploration, astronomy, atmospheric science, biology/bioengineering, cave exploration, deep sea diving and exploration, disaster assessment (360) and medical and other assistance, education, engineering/design, explosives inspection, geological study and exploration, hazardous material inspection, make-a-wish applications, manufacturing and assembly design and simulation, military observation and assistance, mineral exploration, molecular and structural biology, neuroscience, oceanographic studies, physical therapy/rehabilitation, physics, psychological testing and therapy, rapid product prototyping, remote project supervision, research and development, robotics, simulation, space exploration, surgical simulation and training, telehealth/telemedicine, telepresence, teletravel, virtual reality and volumetric human anatomy visualization.

It will be further appreciated by those skilled in the art that the audiovisual presentation system can display any type of video content, including but not limited to ultra-high definition 3D real-world video, over the entire surface of the system enclosure, above the level of the enclosure floor. Moreover, in some embodiments, the acrylic interior panel portion 109 (FIG. 6) of each enclosure dome panel 107 of the enclosure dome 106 may enable a user 154 to write on the interior panel portion 109 using a felt-tipped marker (not illustrated).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An audiovisual presentation system, comprising:
    a transparent system enclosure comprising an enclosure sphere;
    at least one projector outside said system enclosure and generally directed toward an exterior surface of said system enclosure; and
    an enclosure cradle; wherein
    said enclosure sphere is seated in said enclosure cradle.

2. The audiovisual presentation system of claim 1 wherein said at least one projector interfaces with the Internet.

3. The audiovisual presentation system of claim 1 further comprising a remote computer interfacing with said at least one projector and a video recorder interfacing with said remote computer.

4. The audiovisual presentation system of claim 1 wherein said system enclosure comprises an enclosure dome.

5. The audiovisual presentation system of claim 4 wherein said enclosure dome comprises a plurality of enclosure dome panels.

6. The audiovisual presentation system of claim 4 further comprising an enclosure base and wherein said enclosure dome extends from said enclosure base.

7. An audiovisual presentation system, comprising:
    a system enclosure comprising a plurality of enclosure panels having an external transparent portion, an internal transparent portion and a diffuser screen material between said external transparent portion and said internal transparent portion;
    at least one projector outside said system enclosure and generally directed toward at least one external transparent portion of said system enclosure;
    an audiovisual input system interfacing with said at least one projector; and at least one audiovisual input station inside said system enclosure and having at least one audiovisual input station computer interfacing with said audiovisual input system, wherein said at least one audiovisual input station computer is operable by a user located inside said system enclosure, and wherein a projector is responsive to user operation of said at least one audiovisual input station computer.

8. The audiovisual presentation system of claim 7 wherein said audiovisual input system interfaces with the Internet.

9. The audiovisual presentation system of claim 7 further comprising a remote computer interfacing with said at least one projector and a video recorder interfacing with said remote computer.

10. The audiovisual presentation system of claim 7 wherein said system enclosure comprises an enclosure dome.

11. The audiovisual presentation system of claim 10 wherein said enclosure dome comprises a plurality of enclosure dome panels.

12. The audiovisual presentation system of claim 10 further comprising an enclosure base and wherein said enclosure dome extends from said enclosure base.

13. The audiovisual presentation system of claim 7 wherein said system enclosure comprises an enclosure sphere.

14. The audiovisual presentation system of claim 13 further comprising an enclosure cradle and wherein said enclosure sphere is seated in said enclosure cradle.

15. An audiovisual presentation system, comprising:
a transparent system enclosure including a plurality of enclosure dome panels;
each of said enclosure dome panels having an external panel portion, an internal panel portion and a diffuser screen material between said external panel portion and said internal panel portion;
a plurality of projectors outside said system enclosure and generally directed toward said external panel portions of said enclosure dome panels, respectively, of said system enclosure;
an audiovisual input system including at least one server interfacing with said at least one projector and the Internet; and
at least one audiovisual input station in said system enclosure and having a podium, at least one audiovisual input station computer carried by said podium and interfacing with said at least one server of said audiovisual input system and an audio device interfacing with said audiovisual input station computer.

16. The audiovisual presentation system of claim 15 further comprising a remote computer interfacing with said at least one projector and a video recorder interfacing with said remote computer.

17. The audiovisual presentation system of claim 15 wherein said system enclosure comprises an enclosure dome.

18. The audiovisual presentation system of claim 15 wherein said system enclosure comprises an enclosure sphere.

19. The audiovisual presentation system of claim 18 further comprising an enclosure cradle and wherein said enclosure sphere is seated in said enclosure cradle.

\* \* \* \* \*